United States Patent
Uchiyama et al.

(10) Patent No.: US 8,481,151 B2
(45) Date of Patent: Jul. 9, 2013

(54) HYDROGEN STORAGE ALLOY AND HYDROGEN STORAGE UNIT USING SAME

(75) Inventors: Naoki Uchiyama, Hamamatsu (JP); Tomomi Kanai, Hamamatsu (JP); Kazumi Harada, Hamamatsu (JP)

(73) Assignee: Kabushiki Kaisha Atsumitec, Shizuoka (JP)

( * ) Notice: Subject to any disclaimer, the term of this patent is extended or adjusted under 35 U.S.C. 154(b) by 0 days.

(21) Appl. No.: 13/393,798

(22) PCT Filed: Sep. 4, 2009

(86) PCT No.: PCT/JP2009/065504
§ 371 (c)(1),
(2), (4) Date: Mar. 1, 2012

(87) PCT Pub. No.: WO2011/027461
PCT Pub. Date: Mar. 10, 2011

(65) Prior Publication Data
US 2012/0164432 A1 Jun. 28, 2012

(51) Int. Cl.
*C01B 6/24* (2006.01)
*B32B 3/26* (2006.01)

(52) U.S. Cl.
USPC .................. 428/304.4; 420/900; 423/644

(58) Field of Classification Search
USPC ........ 420/402, 414, 900; 502/333; 428/304.4; 423/644
See application file for complete search history.

(56) References Cited

U.S. PATENT DOCUMENTS 5,964,965 A * 10/1999 Schulz et al. .................. 148/420

FOREIGN PATENT DOCUMENTS

| JP | 63-072849 | 4/1988 |
|----|-----------|--------|
| JP | 63-177397 | 11/1988 |
| JP | 11-503489 | 3/1999 |
| JP | 2004-256860 | 9/2004 |
| JP | 2007-520629 | 7/2007 |

OTHER PUBLICATIONS

Au et al. "The hydrogen storage properties and the mechanism of the hydriding process of some multi-component magnesium-base hydrogen storage alloys" 1995, Int. J. Hydrogen Energy, vol. 20, No. 2 pp. 141.*
Deshmukh et al. "New borohydride fuel cell with multiwalled carbon nanotubes as anode: A step towards increasing the power output" 2006, 159 p. 1084-1088.*

* cited by examiner

*Primary Examiner* — Wayne Langel
*Assistant Examiner* — Syed Iqbal
(74) *Attorney, Agent, or Firm* — Cozen O'Connor

(57) ABSTRACT

A hydrogen storage alloy comprises a hydrogen storage base formed of a mixture of magnesium and an alloy, such as a magnesium-nickel alloy, a magnesium-titanium alloy, a magnesium-niobium alloy, a magnesium-manganese alloy, or a magnesium-cobalt alloy, and a catalytic layer covering a surface of the base. A hydrogen storage alloy unit includes the hydrogen storage base and a porous body including an assembly of nanofibers. The alloy may be vapor-deposited onto the assembly of nanofibers. The nanofibers may be tangled to provide spaces between the fibers for the passage of hydrogen molecules. The nanofibers in one example are also porous. A catalytic layer of platinum may cover a surface of the hydrogen storage base.

4 Claims, 5 Drawing Sheets

US 8,481,151 B2

HYDROGEN STORAGE ALLOY AND HYDROGEN STORAGE UNIT USING SAME

RELATED APPLICATIONS

This application is a U.S. National Phase Application under 35 USC 371 of International Application PCT/JP2009/065504 filed Sep. 4, 2009.

TECHNICAL FIELD

This invention relates to a hydrogen storage alloy capable of storing hydrogen and a hydrogen storage unit using the same.

BACKGROUND ART

Fuel cells used in vehicles and others use gaseous hydrogen. Since gaseous hydrogen is very large in volume, compressed hydrogen gas is used. The volume thereof is however still large for practical use, leading to space problems. Liquid hydrogen is smaller in volume than gaseous hydrogen. Holding liquid hydrogen is however difficult and not suited for practical use. Thus, use of hydrogen in the solid state has been being studied and developed to provide reduced volume and enhanced ease of handling. Hydrogen is used in the solid state by being stored in alloys. Such alloys are called hydrogen storage alloys. Hydrogen storage alloys repeat absorbing and releasing hydrogen.

Hydrogen storage alloys of this type are disclosed in patent document 1. Patent document 1 relates to hydrogen storage materials, the method of making the same, and a hydrogen generation device. The disclosed hydrogen storage materials comprise a bulk of a metal Mg (magnesium) with a surface crystalline region X having a short distance between nearest neighboring atoms compared with the other region of the Mg bulk, and have the ability such that 100 parts by weight of the hydrogen storage material can absorb and release 7 parts by weight or more of hydrogen at temperatures lower than or equal to 300° C.

The hydrogen storage materials disclosed in patent document 1 however require heat and pressure for hydrogenation reaction combining the Mg bulk with hydrogen to form $MgH_2$. In other words, the disclosed hydrogen storage alloys need thermal energy and pressure energy to absorb hydrogen. It is inconvenient to supply such energies each time hydrogenation reaction is required.

It is known to catalyze hydrogenation reaction using a catalyst such as Pd (palladium) or Pt (platinum). However, even with the use of such catalyst, hydrogenation reaction requires thermal energy and pressure energy. The need for energy for hydrogenation reaction combining hydrogen storage alloys with hydrogen is considered as a drawback.

Further, Mg has a high ability to store hydrogen, which is an advantage, but its ability to cause hydrogen to diffuse in it in the solid state is low so that it takes time to absorb hydrogen. Mg's low ability to cause hydrogen to diffuse in it in the solid state, or in other words, hydrogen's slowly diffusing in the solid-state Mg means that even though hydrogen is absorbed in Mg in a surface region of a Mg alloy, the hydrogen absorbed is not passed on to Mg in an inner region thereof. Thus, only Mg in the surface region of the Mg alloy combines with hydrogen to form $MgH_2$, which functions as a barrier film preventing a further amount of hydrogen from being absorbed. Such slow diffusion of hydrogen in the solid-state Mg is also considered as a drawback.

PRIOR ART DOCUMENT

Patent Document

Patent document 1: Japanese Patent Application Laid-open No. 2003-147473 Publication

SUMMARY OF THE INVENTION

Problem to be Solved by the Invention

Considering the aforementioned prior art, the present invention aims to provide a hydrogen storage alloy which can absorb hydrogen at room temperature and atmospheric pressure and can cause hydrogen to more quickly diffuse in it in the solid state, thereby reducing time taken for hydrogenation, and a hydrogen storage unit using the same.

Means for Solving the Problem

In order to achieve this object, the invention recited in claim 1 is a hydrogen storage alloy comprising a hydrogen storage base formed of a mixture of magnesium and an alloy selected from a group consisting of a magnesium-nickel alloy, a magnesium-titanium alloy, a magnesium-niobium alloy, a magnesium-manganese alloy and a magnesium-cobalt alloy, and a catalytic layer covering a surface of the hydrogen storage base.

The invention recited in claim 2 is a hydrogen storage alloy of the type recited in claim 1 wherein the catalytic layer is formed of Pd.

The invention recited in claim 3 is a hydrogen storage unit comprising a hydrogen storage alloy recited in claim 1, and a porous body having a large number of holes allowing hydrogen molecules to pass through, said hydrogen storage alloy covering a surface of the porous body, inclusive of surfaces of the holes thereof.

The invention recited in claim 4 is a hydrogen storage unit of the type recited in claim 3 wherein the catalytic layer is formed of Pd.

The invention recited in claim 5 is a hydrogen storage unit of the type recited in claim 3 wherein the porous body is formed of an assembly of nanofibers.

The invention recited in claim 6 is a hydrogen storage unit of the type recited in claim 5 wherein the individual nanofibers are randomly oriented in the assembly.

The invention recited in claim 7 is a hydrogen storage unit of the type recited in claim 3 wherein the hydrogen storage base constituting the hydrogen storage alloy is a layer vapor-deposited on the surface of the porous body.

Effect of the Invention

The hydrogen storage alloy recited in claim 1 can exhibit both a high ability to store hydrogen and a high ability to cause hydrogen to diffuse in it in solid state, provided by Mg and an alloy ($Mg_2Ni$ is particularly desirable), respectively. Hydrogen stored in Mg in one region is passed on to Mg (or $Mg_2Ni$) in another region by virtue of $Mg_2Ni$, for example. Since this movement of hydrogen does not require heat nor pressure, hydrogen can be absorbed at room temperature and atmospheric pressure.

In the hydrogen storage alloy recited in claim 2, Pd catalyzes dissociation of molecular hydrogen into hydrogen atoms ($H_2 \rightarrow 2H$). Hydrogen in the form of atoms is most quickly absorbed in Mg. Unlike Pt, Pd does not have the ability to catalyze ionization of hydrogen atoms. Thus, use of Pd as a catalyst allows hydrogen to stay in the form of atoms, which leads to quick absorption of hydrogen compared with when Pt is used as a catalyst.

In the hydrogen storage unit recited in claim 3, the hydrogen storage alloy covers the surface of a porous body having a large number of holes allowing hydrogen molecules to pass through, thereby providing a hydrogen storage layer with a large surface area, and thus, a large area of contact with hydrogen, leading to quick absorption of hydrogen.

In the hydrogen storage unit recited in claim 4, Pd catalyzes dissociation of molecular hydrogen into hydrogen atoms ($H_2 \rightarrow 2H$). Hydrogen in the form of atoms is most quickly absorbed in Mg. Unlike Pt, Pd does not have the ability to catalyze ionization of hydrogen atoms. Thus, use of Pd as a catalyst allows hydrogen to stay in the form of atoms, which leads to quick absorption of hydrogen compared with when Pt is used as a catalyst.

In the hydrogen storage unit recited in claim 5, nanofibers tangled into an assembly provide a large number of spaces serving as holes allowing hydrogen to pass through. The porous body of this type is easy to form.

In the hydrogen storage unit recited in claim 6, nanofibers are formed into an assembly by simply tangling them, not by deliberately arranging them in a specific arrangement. Even the assembly formed this way provides holes allowing hydrogen to pass through, thereby enabling quick absorption of hydrogen.

In the hydrogen storage unit recited in claim 7, a layer of the hydrogen storage alloy is formed on the porous body by vapor deposition. The hydrogen storage unit of this type is easy to make and capable of quickly absorbing hydrogen.

MODE OF CARRYING OUT THE INVENTION

Figure 1:
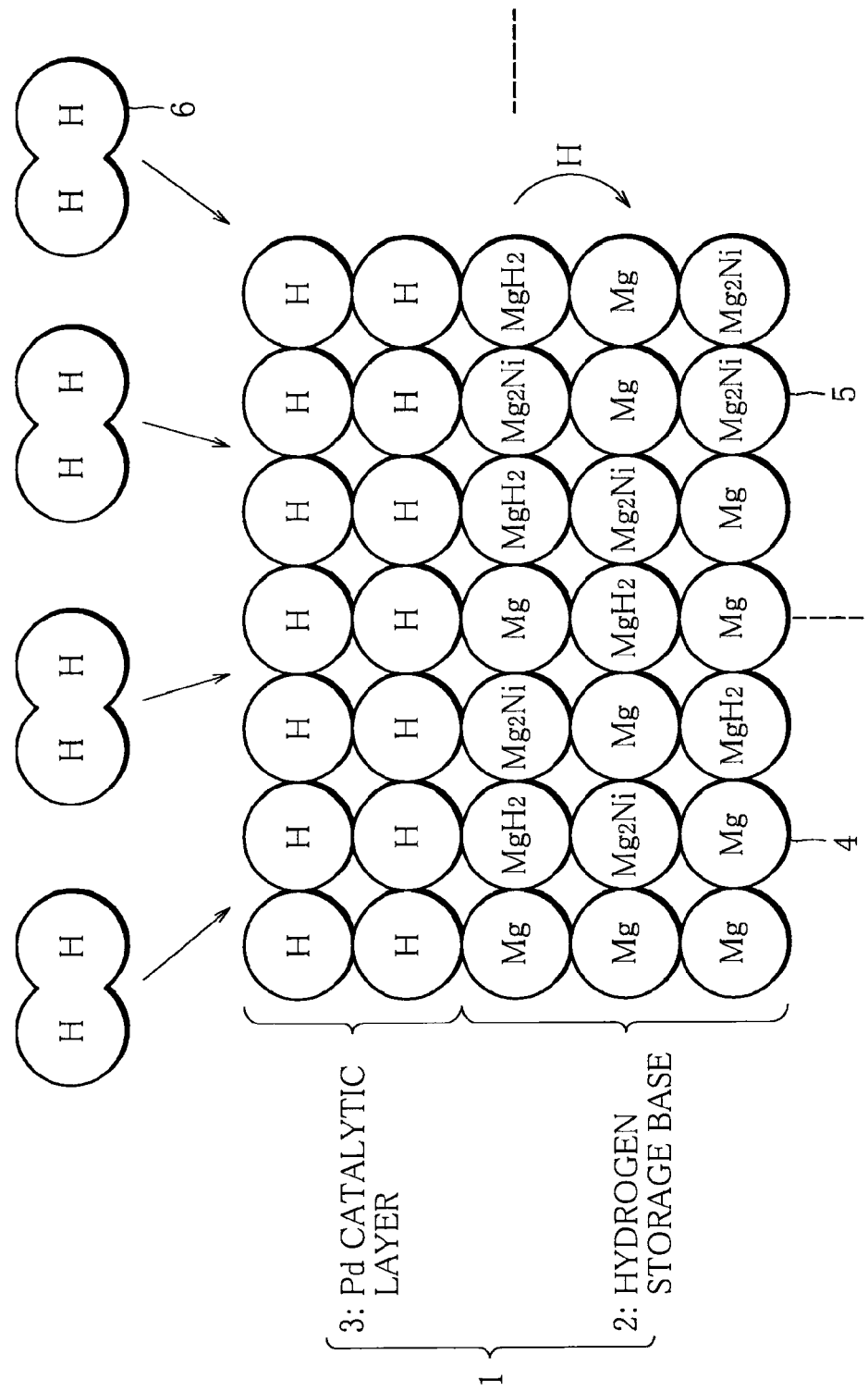
FIG. 1 is a schematic diagram showing a hydrogen storage alloy according to the present invention.

FIG. 1 is a schematic diagram showing a hydrogen storage alloy according to the present invention.

As illustrated, a hydrogen storage alloy 1 according to the present invention comprises a hydrogen storage base 2 and a catalytic layer 3. The hydrogen storage base 2 is a thin film of a mixture of a metal Mg 4 and an alloy (in the illustrated example, $Mg_2Ni$ 5). The ratio between Mg 4 and $Mg_2Ni$ 5 in the mixture is 0 to 10 (exclusive of 0) mol of Mg for 1 mol of $Mg_2Ni$, more desirably 4 to 8 mol of Mg for 1 mol of $Mg_2Ni$. It is particularly desirable that the mixture have composition represented by chemical formula $Mg_6Ni$. Mg 4 and $Mg_2Ni$ 5 mixed this way experience chemical reactions shown below. As indicated by arrows in the illustration, hydrogen atoms H are passed on to Mg (or $Mg_2Ni$) in an inner region. This means that hydrogen actively diffuses in the solid-state base 2, and thus, is quickly absorbed therein. It is desirable that the hydrogen storage base 2 be amorphous. The hydrogen storage base 2 being in the form of a thin film also contributes to quick absorption of hydrogen.

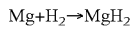

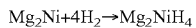

Thus, by mixing Mg 4 and $Mg_2Ni$ 5, a hydrogen storage alloy is obtained which exhibits both a high ability to store hydrogen and a high ability to cause hydrogen to diffuse in it in the solid state, provided by Mg 4 and $Mg_2Ni$ 5, respectively. This movement of hydrogen does not require heat nor pressure, which means that hydrogen can be absorbed at room temperature and atmospheric pressure.

The catalytic layer 3 is formed of Pd (palladium). The catalytic layer 3 is formed to cover the entire surface of the hydrogen storage base 2. Alternatively, the catalytic layer 3 may partly cover the surface of the hydrogen storage base 2. Pd catalyzes dissociation of molecular hydrogen into hydrogen atoms ($H_2 \rightarrow 2H$). Hydrogen in the form of atoms is most quickly absorbed in Mg. Unlike Pt, Pd does not have the ability to catalyze ionization of hydrogen atoms. Thus, use of Pd as a catalyst allows hydrogen to stay in the form of atoms, which leads to quick absorption of hydrogen compared with when Pt is used as a catalyst.

When the above-described hydrogen storage alloy 1 is used to store hydrogen, hydrogen 6 contained in gases contacts the Pd catalytic layer 3 and is dissociated into hydrogen atoms. Then, the hydrogen atoms are absorbed in Mg 4 and $Mg_2Ni$ 5 in a surface region of the hydrogen storage base 2. The hydrogen atoms thus absorbed is further absorbed in Mg 4 and $Mg_2Ni$ 5 in an inner region of the hydrogen storage base 2, by virtue of $Mg_2Ni$ 5.

In place of the aforementioned $Mg_2Ni$, other magnesium-nickel alloys, magnesium-titanium alloys, magnesium-niobium alloys, magnesium-manganese alloys, or magnesium-cobalt alloys may be used. The catalytic layer 3 may be formed of a substance other than Pd (palladium), such as Pt (platinum), Nb (niobium) or ZrNi (zirconium nickel).

Figure 2:
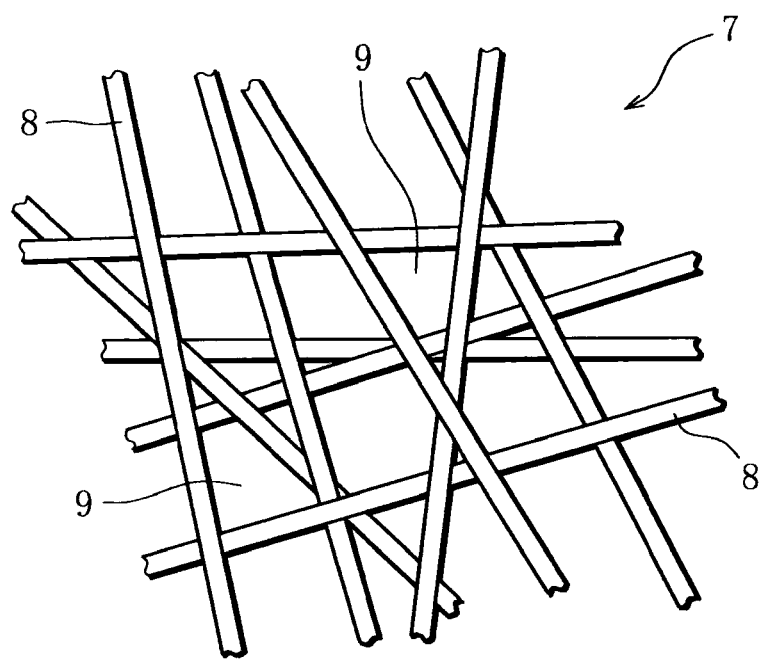
FIG. 2 is a schematic diagram showing a hydrogen storage unit according to the present invention.

FIG. 2 is a schematic diagram showing a hydrogen storage unit according to the present invention.

As illustrated, the hydrogen storage unit 7 according to the present invention is in the form of an assembly of hydrogen storage fibers 8, namely nanofibers with a hydrogen storage alloy 1 (see FIG. 1) vapor-deposited thereon. A large number of hydrogen storage fibers 8 are tangled to intersect one another, thereby providing spaces 9 between one another. The individual nanofibers may be randomly oriented, but are tangled to provide spaces 9 having a size allowing hydrogen molecules to pass through. The hydrogen storage alloy 1 (see FIG. 1), vapor-deposited on such nanofibers, can provide a large surface area of the hydrogen storage base 2 (see FIG. 1), and thus, provide a large area of contact with hydrogen. Specifically, the spaces 9 function as holes for hydrogen molecules to pass through, thereby allowing hydrogen to be absorbed not only in a surface region of the hydrogen storage unit 7 but also in an inner region of the hydrogen storage unit 7, thus enabling quick absorption of hydrogen.

If nanofibers used have many holes in themselves, or in other words, they are porous nanofibers, for example, the hydrogen storage base 2 (see FIG. 1) can have a further increased surface area, and thus, a further increased area of contact with hydrogen, enabling quicker absorption of hydrogen. The hydrogen storage unit may be formed using other porous materials having holes allowing hydrogen to pass through.

Figure 3:
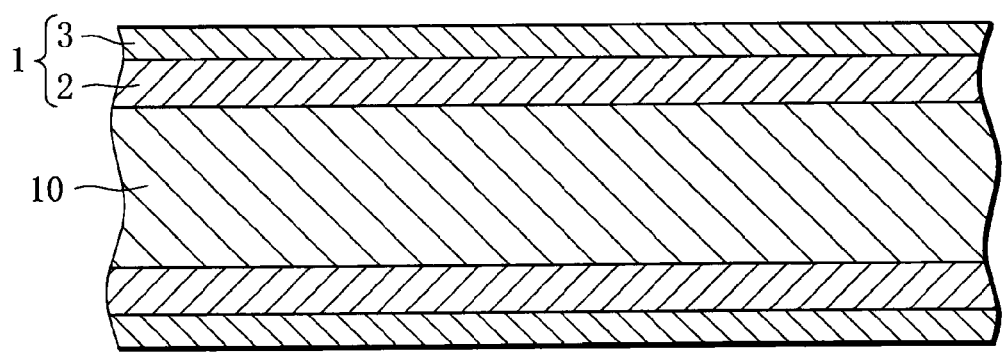
FIG. 3 shows a longitudinal cross-sectional view of a hydrogen storage fiber.
Figure 4:
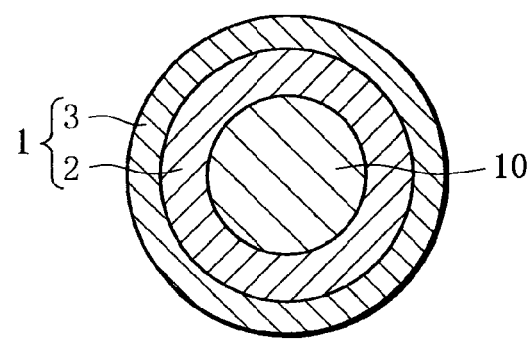
FIG. 4 is a transverse cross-sectional view of the hydrogen storage fiber shown in FIG. 3.

FIG. 3 is a longitudinal cross-sectional view of a hydrogen storage fiber, and FIG. 4 a transverse cross-sectional view of the hydrogen storage fiber shown in FIG. 3.

As illustrated, a hydrogen storage fiber 8 comprises a nanofiber 10, a hydrogen storage base (hydrogen storage layer) 2 and a catalytic layer 3. More specifically, a layer of a hydrogen storage alloy 1 is vapor-deposited on the surface of the nanofiber 10. A large number of such hydrogen storage fibers 8 are tangled to intersect one another and form an assembly functioning as a hydrogen storage unit 7. When the nanofiber 10 has a smooth surface, the hydrogen storage alloy is uniformly vapor-deposited, as illustrated. The nanofibers can be produced by electrospinning or other processes.

Figure 5:
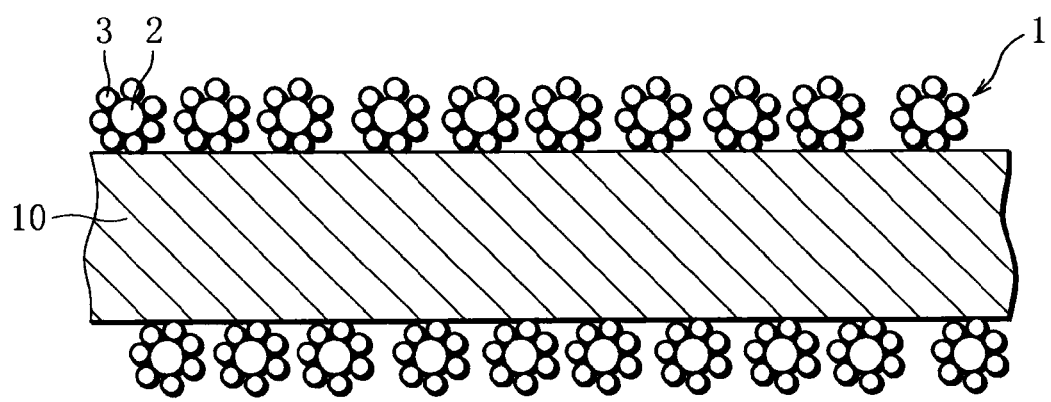
FIG. 5 shows a longitudinal cross-sectional view of a hydrogen storage fiber of another type.
Figure 6:
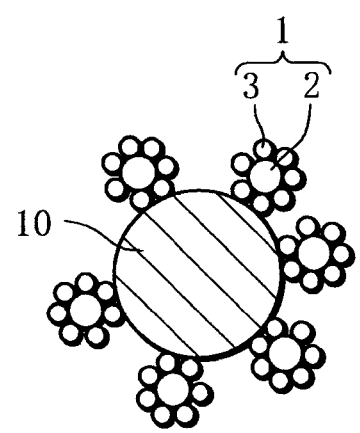
FIG. 6 is a transverse cross-sectional view of the hydrogen storage fiber shown in FIG. 5.

FIG. 5 is a longitudinal cross-sectional view of a hydrogen storage fiber of another type, and FIG. 6 a transverse cross-sectional view of the hydrogen storage fiber shown in FIG. 5.

As illustrated, a hydrogen storage alloy 1 is in the form of nanoparticles having a sphere-shaped hydrogen storage base of Mg and $Mg_2Ni$ (hydrogen storage core) 2 surround by a spherical catalyst layer 3 of Pd. The hydrogen storage cores 2 and the catalyst layer 3 form a colloid. The hydrogen storage fiber 8 is a nanofiber 10 with such nanoparticles of the hydrogen storage alloy adhering to its circumference.

As understand from the above, the hydrogen storage alloy 1 can be obtained in various forms by using appropriately-selected alloy 1-making processes.

Figure 7:
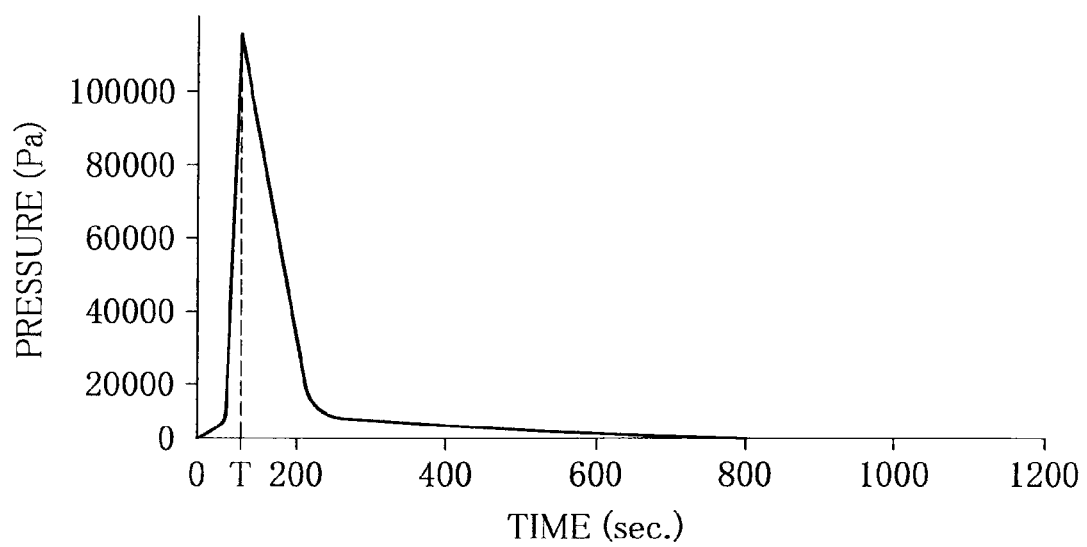
FIG. 7 is a graph showing how pressure varies with time when hydrogen is absorbed with a hydrogen storage unit according to the present invention.

FIG. 7 is a graph showing how pressure varies with time when hydrogen is absorbed with a hydrogen storage unit according to the present invention.

As seen in the graph, as hydrogen is supplied to an evacuated space, pressure in the space increases and hydrogen begins to be absorbed in the hydrogen storage alloy. At time T, supply of hydrogen is stopped, and the hydrogen storage alloy continues storing hydrogen. Then, the pressure steeply drops. This drop in pressure means drop in pressure of gaseous hydrogen supplied, and thus, hydrogen being absorbed. It is therefore confirmed that hydrogen is being absorbed quickly.

Specifically, this test was conducted using an apparatus comprising a four-way tube containing a hydrogen storage unit, with its three ports, each fitted with a valve, being connected to a pressure gauge, a vacuum pump and a hydrogen canister, respectively. First, the four-way tube was depressurized with the vacuum pump until the pressure therein was stabilized (approximately 20 Pa). Then the valve connected to the vacuum pump was closed and the valve connected to the hydrogen canister was opened. After hydrogen was supplied so that the pressure in the four-way tube reached a desired value, the valve connected to the hydrogen canister was closed and variation in pressure was monitored with the pressure gauge. In the test conducted, the pressure dropped from 107190 Pa to 320 Pa. The hydrogen storage alloy used was $Mg_2Ni+Pd$ and the hydrogen supplied was 100% $H_2$, which was supplied at the rate of 6 (ml/min).

EXPLANATION OF REFERENCE NUMERALS

1: Hydrogen storage alloy
2: Hydrogen storage layer
3: Catalytic layer
4: Mg
5: $Mg_2Ni$
6: Hydrogen
7: Hydrogen storage unit
8: Hydrogen storage fiber
9: Space
10: Nanofiber

The invention claimed is:

1. A hydrogen storage unit, comprising:
   a hydrogen storage alloy comprising:
      a hydrogen storage base comprising a mixture of magnesium and an alloy selected from a group consisting of a magnesium-nickel alloy, a magnesium-titanium alloy, a magnesium-niobium alloy, a magnesium-manganese alloy and a magnesium-cobalt alloy; and
      a catalytic layer covering a surface of the hydrogen storage base; and
   a porous body having a large number of holes allowing hydrogen molecules to pass through, the porous body comprising an assembly of porous nanofibers;
   wherein the hydrogen storage alloy covers a surface of the porous body, including surfaces of the holes.

2. The hydrogen storage unit according to claim 1, wherein the catalytic layer is formed of Pd.

3. The hydrogen storage unit according to claim 1, wherein individual nanofibers of the assembly are randomly oriented in the assembly.

4. The hydrogen storage unit according to claim 1, wherein the hydrogen storage base comprises a vapor-deposited layer on the surface of the porous body.

\* \* \* \* \*